(12) United States Patent
Crossen et al.

(10) Patent No.: US 9,469,076 B1
(45) Date of Patent: Oct. 18, 2016

(54) SYSTEM FOR CLEANING CART DRIVE COMPONENTS IN THREE-DIMENSIONAL OBJECT PRINTING SYSTEMS

(71) Applicant: Xerox Corporation, Norwalk, CT (US)

(72) Inventors: Elizabeth M. Crossen, Churchville, NY (US); Timothy P. Foley, Marion, NY (US); Christopher D. Atwood, Webster, NY (US); Frank B. Tamarez Gomez, Webster, NY (US); Matthew D. Savoy, Webster, NY (US); Annie Liu, Webster, NY (US); David S. Derleth, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 21 days.

(21) Appl. No.: 14/692,982

(22) Filed: Apr. 22, 2015

(51) Int. Cl.
| | | |
|---|---|---|
| *B29C 67/00* | (2006.01) | |
| *B08B 1/00* | (2006.01) | |
| *B33Y 30/00* | (2015.01) | |
| *B33Y 40/00* | (2015.01) | |

(52) U.S. Cl.
CPC ............ *B29C 67/0096* (2013.01); *B08B 1/005* (2013.01); *B33Y 30/00* (2014.12); *B33Y 40/00* (2014.12)

(58) Field of Classification Search
None
See application file for complete search history.

(56) References Cited

U.S. PATENT DOCUMENTS

| | | | |
|---|---|---|---|
| 2,765,547 A | 10/1956 | Dimmel et al. | |
| 2,944,275 A | 7/1960 | Markusen | |
| 5,904,100 A | 5/1999 | Findley et al. | |
| 6,191,507 B1 | 2/2001 | Peltier et al. | |
| 6,367,791 B1 * | 4/2002 | Calderon ............ B29C 47/0014 269/291 |
| 6,688,021 B2 | 2/2004 | Baig et al. | |
| 7,070,250 B2 | 7/2006 | Lester et al. | |
| 8,167,395 B2 | 5/2012 | Fienup et al. | |
| 8,288,004 B2 | 10/2012 | Moorlag et al. | |
| 8,692,011 B2 | 4/2014 | Moorlag et al. | |
| 8,851,664 B2 | 10/2014 | Spence | |
| 9,289,947 B1 * | 3/2016 | Fromm ............... B29C 67/0096 |
| 2011/0125307 A1 | 5/2011 | Dickson et al. | |
| 2012/0157277 A1 | 6/2012 | Moorlag et al. | |
| 2013/0293652 A1 | 11/2013 | Spence et al. | |
| 2013/0293653 A1 | 11/2013 | Spence et al. | |
| 2014/0125749 A1 | 5/2014 | Spence | |

FOREIGN PATENT DOCUMENTS

EP 2 474 418 B1 7/2012

* cited by examiner

*Primary Examiner* — Ryan Ochylski
(74) *Attorney, Agent, or Firm* — Maginot Moore & Beck LLP

(57) ABSTRACT

A printing system for forming three-dimensional objects includes two laterally spaced rails, each of the rails have an internal cavity extending through the rail along a longitudinal axis. The printing system further includes two heating devices, one heating device is connected to the internal cavity of one of the two laterally spaced rails and the other heating device is connected to the internal cavity of the other of the two laterally spaced rails to enable each heating device to heat a surface of the rail in which the heating device is positioned. The printing system further includes a platform configured to move along the laterally spaced rails. The printing system also includes at least one of a pair of scrapers, wiper pads, and wiper blades mounted to the cart.

20 Claims, 8 Drawing Sheets

SYSTEM FOR CLEANING CART DRIVE COMPONENTS IN THREE-DIMENSIONAL OBJECT PRINTING SYSTEMS

TECHNICAL FIELD

The system and method disclosed in this document relate to printers that produce three-dimensional objects and, more particularly, to the maintenance of cart drive mechanisms in such printers.

BACKGROUND

Digital three-dimensional manufacturing, also known as digital additive manufacturing, is a process of making a three-dimensional solid object of virtually any shape from a digital model. Three-dimensional printing is an additive process in which one or more ejector heads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

A previously known three-dimensional object printing system 10 is shown in FIG. 8. In the view depicted in that figure, the cart 14 (FIG. 8) moves in a process direction P on precision rails 38 underneath the printing station 26. Precision rails 38 are cylindrical rail sections that are manufactured within tight tolerances to help ensure accurate placement and maneuvering of the cart 14 beneath the ejector heads 30. Linear electrical motors are provided within housing 42 to interact with a magnet inside housing 46 (FIG. 7) connected to the lower surface of the cart 14, as described below, to propel the cart 14 along the track rails 22 between printing stations 26. Once the cart 14 reaches the rails 38, the bearings 34 transition to the precision rails 38. As the cart 14 passes beneath the printing station 26, the ejection of material occurs. Electrical motors (not shown) are configured to move the ejector heads 30 in an X-Y plane that is parallel to the process direction P as layers of material are printed on the cart 14. Additional motors (not shown) move the printing station 26 vertically with respect to the cart 14 as layers of material accumulate to form an object. Alternatively, a mechanism can be provided to move an upper surface of the cart 14 on which the object is being formed vertically and horizontally with respect to rails 38 as the layers of the object are formed. Once the printing to be performed by a printing station is finished, the cart 14 moves to a position that enables the bearings 34 to contact rails 22 so the cart can slide along the rails 22 to another printing station for further part formation, layer curing or other processing.

An end view of the prior art system 10 is shown in FIG. 7. That view depicts in more detail the relationship between the cart 14 and the track rails 22 as well as the precision rails 38. In the area underneath a printing station 26, bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 is perpendicular to the other rail 38 to remove one more degree of freedom. Linear motors within the housing 42 generate electromagnetic fields that interact with the magnet in housing 46, which has a bottom surface 50, to move the cart 14 along the precision rails. Gravity and magnetic attraction between the stationary motor segment and the magnet within housing 46 hold the bearings 34 in contact with the rails 38. Extensions from the rails 22 fit in the slots 52 of the cart 14 to enable the cart to slide along the extensions between printing stations 26 as the linear motors propel the cart.

When a cart is not present underneath the ejector heads 30, errant drips of materials can fall from the ejector heads and produce undesired debris and contamination on an area 54 that can include the precision rails 34, the track rails 22, and the housing 42. In order to produce three-dimensional objects with acceptable quality, the motion of the cart 14 beneath the ejector heads 30 needs to be precise. If materials from the ejector heads collect where the bearings 34 interface with the precision rails, the linear velocity of the cart is disrupted and the quality of the printed object is affected. Additionally, the collection of material drops on top of the housing 42 may affect the dissipation of heat from the motors and impact the performance and reliability of the motors. Therefore, improvements in three-dimensional printing systems that help eliminate the contamination on the precision rails and motor housing that affects the accuracy of the placement and movement of the cart would be beneficial.

Devices have been produced that enable clearing of undesirable material from tracks. Metal flaps and plows positioned in front of wheels on a railroad engine have been used to clear materials such as ice and snow from railroad tracks. Wiping cloths or cleaning tissues affixed to an underside of model trains have also been used to wipe undesired materials from model railroad tracks. However, such techniques are not optimized for use in removing materials used in three-dimensional printing, which may solidify or cure after being ejected. Such techniques are also not adapted to cleaning curved surfaces. Hand-tools having a curved edge adapted to scrape a curved surface have been produced, but such hand-tools are not optimized for cleaning materials used in three-dimensional printing or for cleaning along a continuous track.

SUMMARY

An improved cart helps clean materials from rails in a three-dimensional object printing system. The cart includes two laterally spaced rails, each of the rails having an internal cavity extending through the rail along a longitudinal axis, two heating devices, one heating device connected to the internal cavity of one of the two laterally spaced rails and the other heating device connected to the internal cavity of the other of the two laterally spaced rails to enable each heating device to heat a surface of the rail to which the heating device is connected, a platform configured to move along the two laterally spaced rails, and a pair of scrapers mounted to the platform, one scraper being positioned to engage one of the two laterally spaced rails and the other scraper being positioned to engage the other of the two laterally spaced rails to enable the two scrapers to remove contaminant from the heated surfaces of the laterally spaced rails as the platform moves along the two laterally spaced rails.

A three-dimensional object printing system that incorporates improved the carts includes two laterally spaced rails, each of the rails having an internal cavity extending through the rail along a longitudinal axis, two heating devices, one heating device connected to the internal cavity of one of the two laterally spaced rails and the other heating device connected to the internal cavity of the other of the two laterally spaced rails to enable each heating device to heat a surface of the rail to which the heating device is connected, a platform configured to support a three-dimensional object being formed by the three-dimensional object printing system, a plurality of bearings mounted to the platform to enable the platform to be supported on the two laterally spaced rails, and a pair of scrapers mounted to the platform, one scraper being positioned to engage one of the two laterally spaced rails and the other scraper being positioned to engage the other of the two laterally spaced rails to enable the two scrapers to remove contaminant from the heated surfaces of the laterally spaced rails as the platform moves along the two laterally spaced rails.

BRIEF DESCRIPTION OF THE DRAWINGS

The foregoing aspects and other features of a cart that removes accumulated material and other debris from the precision surfaces within the printing system are explained in the following description, taken in connection with the accompanying drawings.

DETAILED DESCRIPTION

Figure 1A:
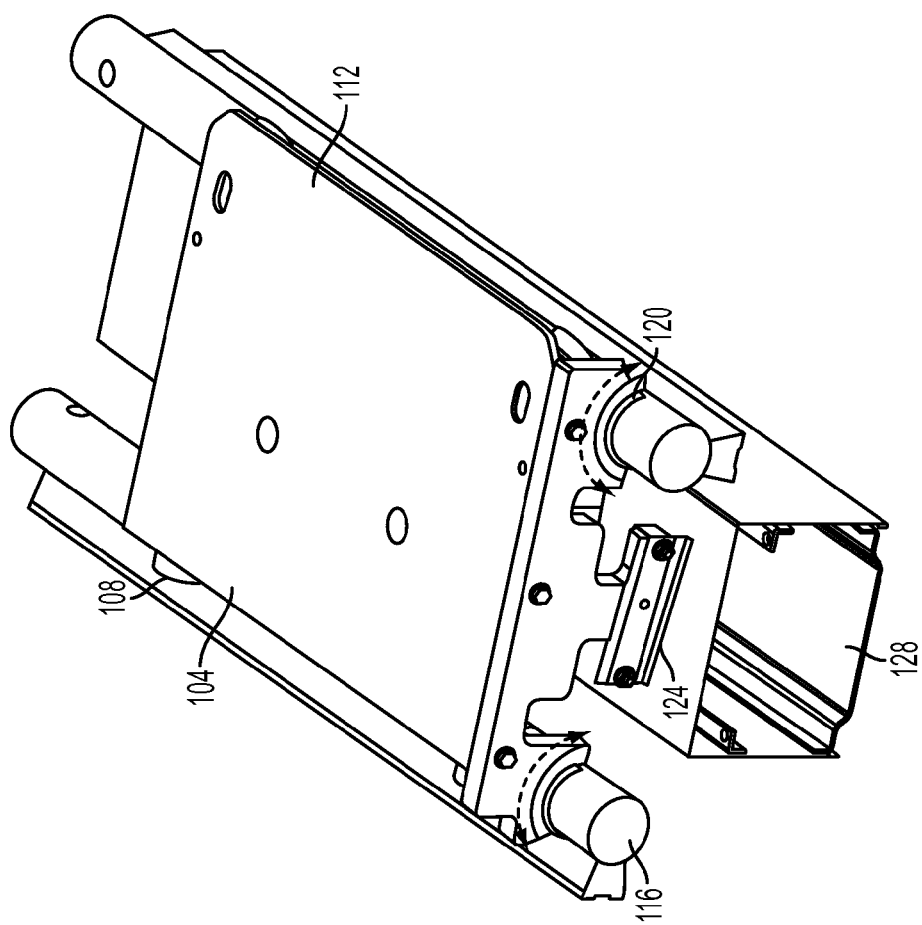
FIG. 1A and FIG. 1B illustrate an exemplary embodiment of the cart that is configured to remove the contaminants from the printing system.
Figure 1B:
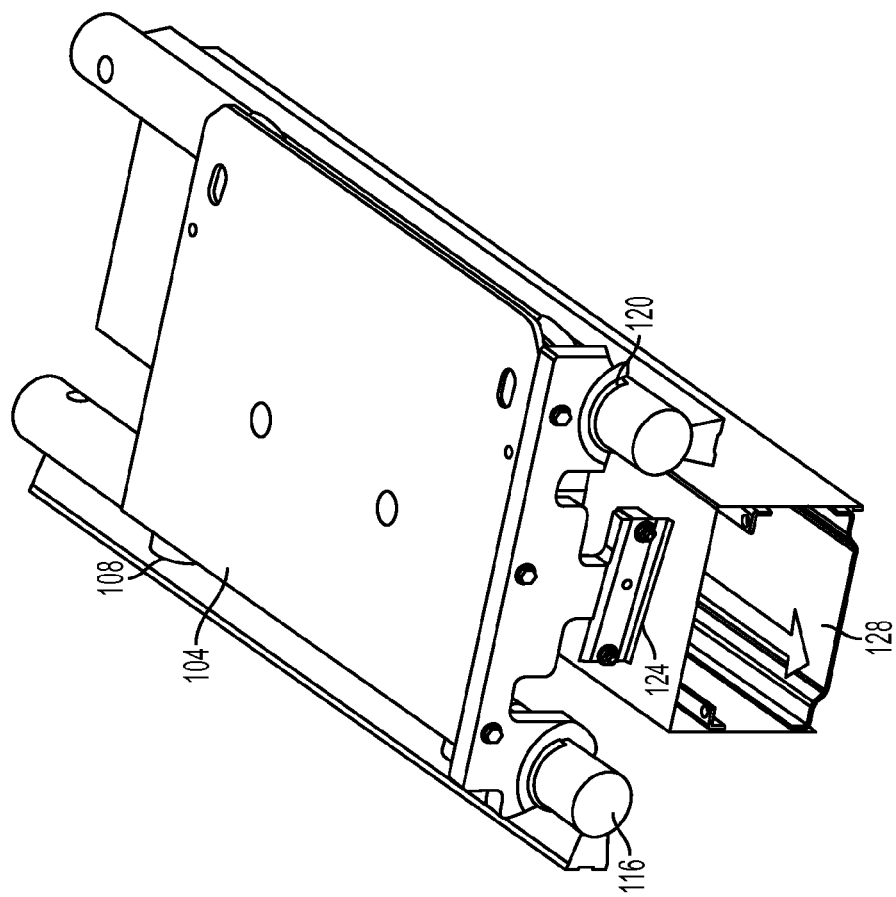

For a general understanding of the environment for the system and method disclosed herein as well as the details for the system and method, reference is made to the drawings. In the drawings, like reference numerals designate like elements FIG. 1A and FIG. 1B illustrate an exemplary embodiment of the cart 104 that is configured to remove the contaminants from rails of the printing system on which the cart moves. The cart 104 includes bearings 108 on which a platform 112 is mounted. The bearings 108 allow the cart 104 to roll along the precision rails 116. The cart 104 also includes scrapers 120 that are mounted on the platform of the cart 104 to scrape and remove contamination from the surface of the precision rails 116 as the cart 104 moves along the precision rails 116. The scrapers 120 can be in the shape of the perimeter of the precision rails 116, such as circular, and be mounted to a support member affixed to the front of the cart 104. In one example, the scrapers 120 can be semi-circular to engage with an upper portion of the surface of the precision rails 116. In another example, the scrapers 120 are shaped into circular segments having a central angle that is less than 180 degrees, such as about 160 degrees. The cart 104 also includes a wiper blade 124 that extends beneath the cart 104 to wipe contamination from the housing 128 for the linear motors. The wiper blade 124 can be angled to direct the contamination towards one side of the housing 128 of the motors away from equipment such as pucks that are mounted beneath the cart 104. The reader should also understand that the scrapers 120 and the wiper blade 124 can be positioned either in front of the cart 104 as illustrated in FIG. 1A and FIG. 1B or in another position with respect to the cart 104.

Figure 2A:
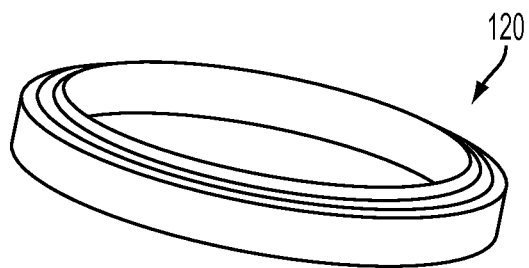
FIG. 2A illustrates an exemplary embodiment of the scrapers configured to remove contamination from the printing system.
Figure 2B:
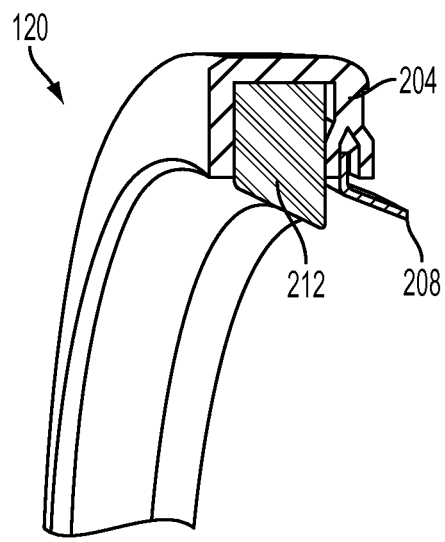
FIG. 2B illustrates an exemplary cross-section of the scrapers depicted in FIG. 2A.

FIG. 2A illustrates an exemplary embodiment of the scrapers 120 configured to remove contamination from the printing system. In this exemplary embodiment, the scrapers 120 are circular in shape to allow the scrapers 120 to roll along the surface of the precision rails 116 and scrape contamination from the surface of the precision rails 116. FIG. 2B illustrates an exemplary cross-section of the scrapers 120. The scrapers 120 include a lip 208 that extends from the scraper 120 at an angle, such as an acute angle, towards the surface of the precision rails 116 to scrape off contamination from the precision rails 116. The lip 208 can be positioned in a shell 204 on one side of the scraper 120. The shell 204 consists of a metal such as steel. In one example, the lip 208 engages less than one-half of the circumference of the rail engaged by the scraper 120. The lip 208 can consist of a material such as a metal or the like. In one example, the lip 208 essentially consists of spring brass. The scraper 120 also includes a wiper 212 that is enclosed within the scraper 120. The wiper 212 can consist of acrylonitrile-butadiene rubber (NBR). The wiper 212 is configured to remove contaminants that were loosened from the precision rail 116 by the lip 208. As the cart transitions onto the precision rails 116, the lip 208 and the wiper 212 are in contact with the precision rails but are not constrained to the diameter of the precision rails 116. In one example, while the bearings are rigidly mounted to and fully support the cart 104 on the precision rails 116, the scrapers 120 rest on the circumference and translate along the precision rails 116 as the cart 104 rolls on the precision rails 116 in a process direction. Positioning the scrapers 120 in this manner can avoid over-constraining the cart 104 due to mechanical tolerances. The wiper 212 and the lip 208 enable the scraper 120 to scrape contamination such as dirt, foreign particles, or moisture from the surface of the precision rails 116. The reader should understand that parameters related to the scraper, precision rails, and cart, examples of which include, but are not limited to, the geometry of the scraper, the precision rails, and the cart and the velocity of the cart can vary to accommodate the geometries and dimensions of other printing systems.

Figure 3:
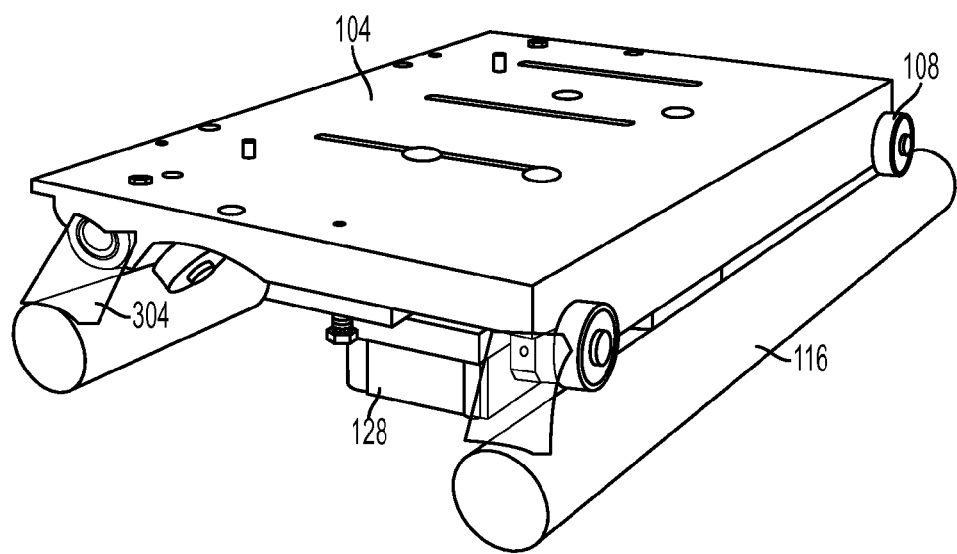
FIG. 3 illustrates an exemplary embodiment of wiper pads that are configured to remove the contaminants from the printing system.

FIG. 3 illustrates another exemplary embodiment of the cart 104 that is configured to remove the contaminants from the printing system. The cart 104 includes wiper pads 304 that are mounted to the front of the cart 104 at a position that enables the wiper pads to remove contaminants away from the precision rails 116 of the printing system. In one example, the wiper pads 304 extend towards the center of the precision rails to direct debris and contamination falling from the precision rails to either side of the pucks mounted underneath the cart 104.

Figure 4:
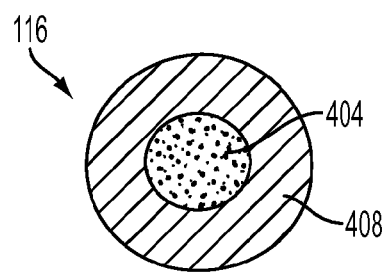
FIG. 4 illustrates an exemplary cross-section of an internally heated precision rails that enable contamination to be removed from the printing system.

FIG. 4 illustrates an exemplary cross-section of the precision rails 116 that enable contamination to be removed from the rails of the printing system. The precision rails 116 consist of a heating device 404 connected to the internal cavity of a rail 116 to heat the precision rails 116. In one embodiment, the heating device 404 is positioned either inside or outside a cylindrical shell 408 of the precision rails 116 in order to heat the exterior 408 of the precision rails 116 to a predetermined temperature. The exterior 408 can essentially consist of metal, ceramic, or the like. In one example, the heating device 404 can be positioned along the entire length of the precision rails 116.

Figure 5:
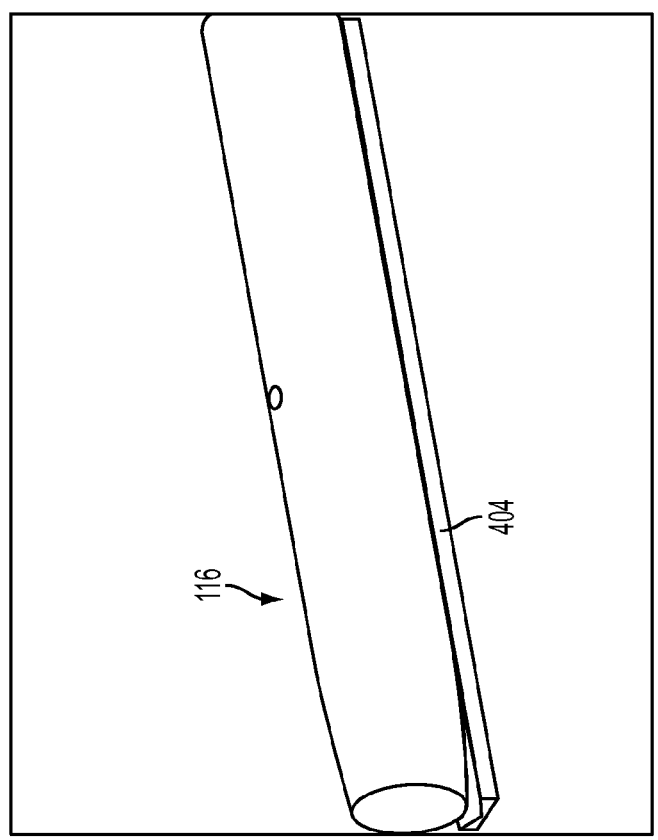
FIG. 5 illustrates an exemplary embodiment of an externally heated precision rails.

FIG. 5 illustrates an exemplary embodiment of the precision rails 116. The heating device 404 can be flexible to conform to the shape of the rails 116 and provide heat to the precision rails 116. In one example, the heating device 404 is mounted along a lower surface of a rail 116 to provide controlled heating in the required areas of the precision rails 116. In another example, the heating device 404 is positioned either inside the rail 116 or outside the rail 116. Examples of the heating device 404 include, but are not limited to, a heat pad, a heat sheet, or the like. The reader should understand that parameters commonly associated with heating devices, such as watt density, control voltage and temperature set points can vary to accommodate the geometries and dimensions of the precisions rails being heated by the heating devices.

Figure 6A:
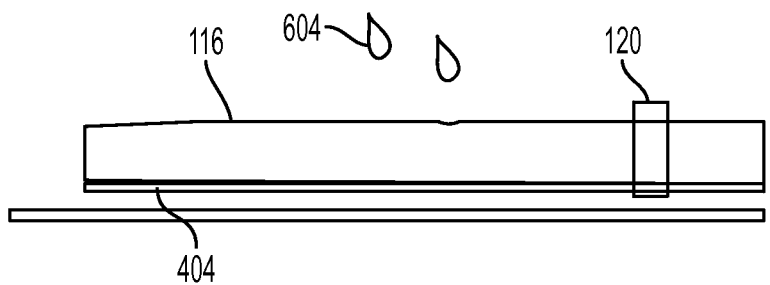
FIG. 6A, FIG. 6B, FIG. 6C, and FIG. 6D illustrate an exemplary process of removing contamination from the printing system.
Figure 6B:
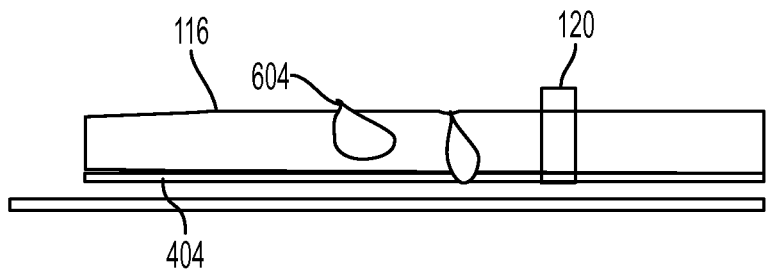
Figure 6C:
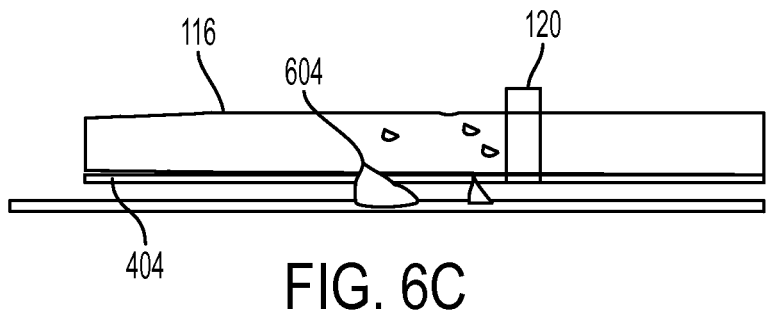
Figure 6D:
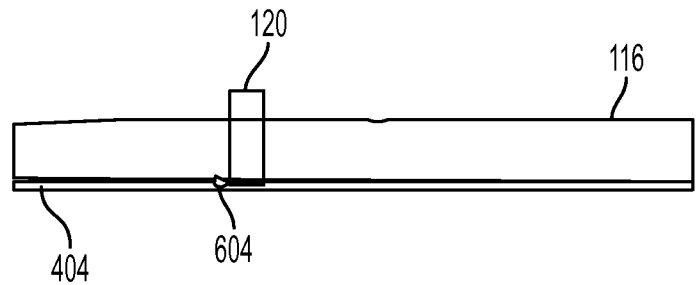
Figure 7:
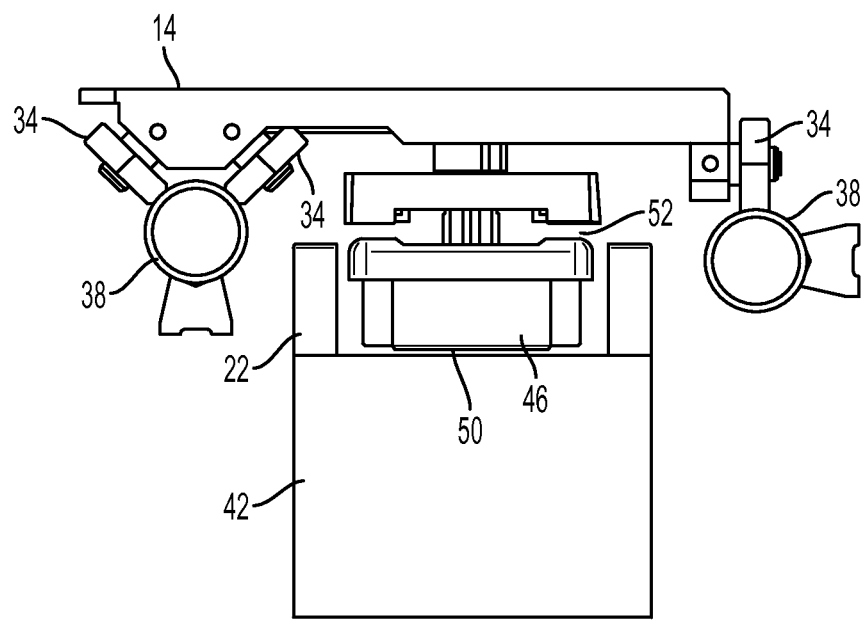
FIG. 7 illustrates an end view of an exemplary prior art embodiment of a cart for a printing system.
Figure 8:
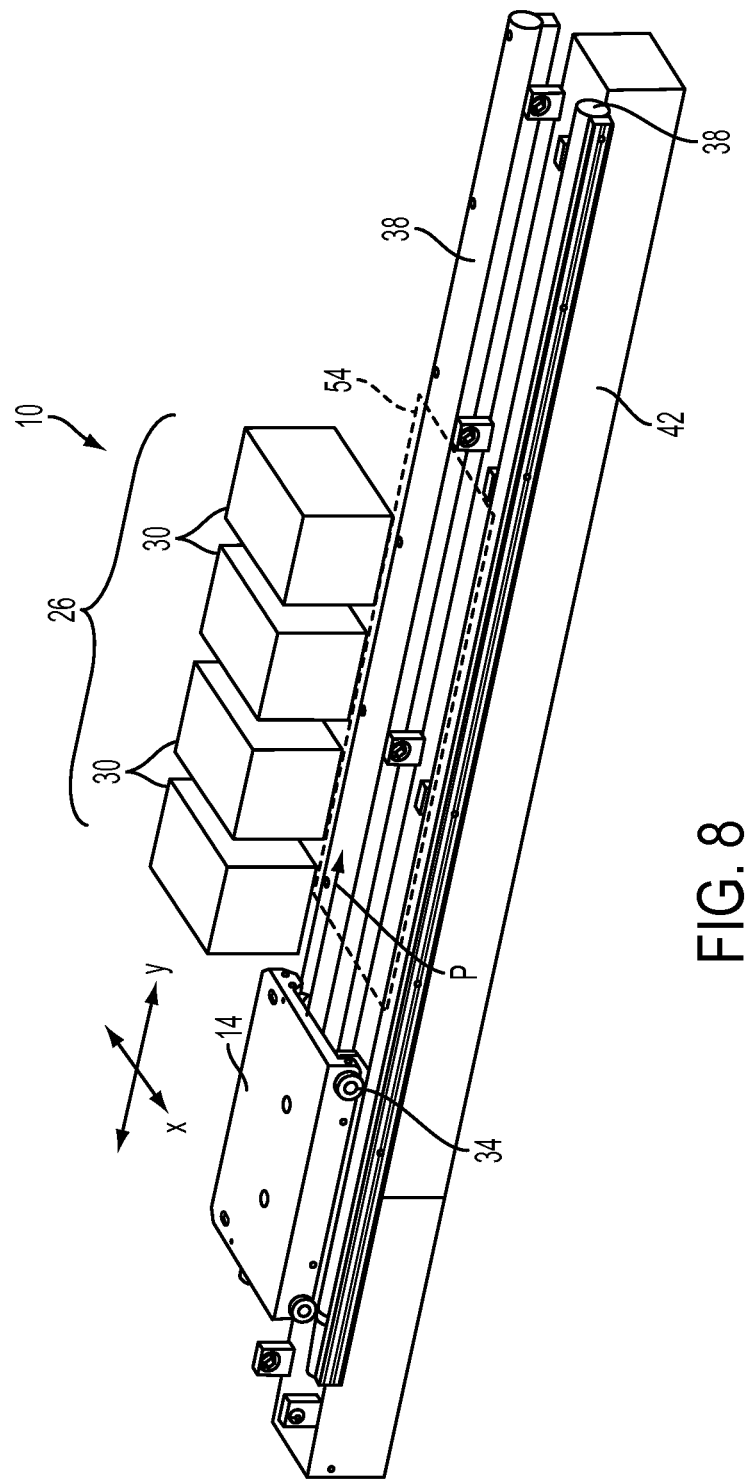
FIG. 8 illustrates an isometric view of the exemplary prior art embodiment of a cart for a printing system depicted in FIG. 7.

FIG. 6A, FIG. 6B, FIG. 6C, and FIG. 6D illustrate an exemplary process of removing contamination 604 from the printing system. As illustrated in FIG. 6A, as the cart 104 transitions from the standard track rails 22 (FIG. 8) onto the precision rails 116 in a process direction, the scrapers 120 engage with the outer diameter of the precision rails 116. A heating device 404 is mounted to the rails 116 to heat the precision rails 116. As illustrated in FIG. 6B, the precision rails 116 are heated to a temperature that causes the contaminants 604 to melt or loosen from the surface of the precision rails 116. The thermal energy needed to heat the precision rails 116 is provided by the heating device 404. As illustrated in FIG. 6C, the contaminants 604 melt and drip from the surface of precision rails 116 after being melted. As illustrated in FIG. 6D, the scraper 120 scrapes and removes the residual contaminants 604 that remain on the surface of the precision rails 116 as the cart 104 and the scraper 120 move along a process direction. In one example, the scrapers 120 are located ahead of the cart 104 and the bearings 108 to scrape, wipe, and prevent any contaminants coming in contact with the cart 104, such as the bearings 108. The reader should understand that while the scrapers 120 and the wiper pads 304 in these examples are positioned in front of the cart 104, other embodiments locate the scrapers 120 and the wiper pads 304 in other positions that can vary with respect to the cart 104.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printing system for forming three-dimensional objects comprising:
    two laterally spaced rails, each of the rails having an internal cavity extending through the rail along a longitudinal axis;
    two heating devices, one heating device connected to the internal cavity of one of the two laterally spaced rails and the other heating device connected to the internal cavity of the other of the two laterally spaced rails to enable each heating device to heat a surface of the rail to which the heating device is connected;
    a platform configured to move along the two laterally spaced rails; and
    a pair of scrapers mounted to the platform, one scraper being positioned to engage one of the two laterally spaced rails and the other scraper being positioned to engage the other of the two laterally spaced rails to enable the two scrapers to remove contaminant from the heated surfaces of the laterally spaced rails as the platform moves along the two laterally spaced rails.

2. The printing system of claim 1, each of the scrapers further comprising:
    a lip configured to engage a portion of a perimeter of the rail.

3. The printing system of claim 2, wherein each rail of the laterally spaced rails is cylindrical, and the lip of each scraper is a circular segment corresponding to a circumference of the cylindrical rail engaged by the scraper.

4. The printing system of claim 3, wherein each lip extends from each scraper at an acute angle to a surface of the rail engaged by the scraper and each lip engages less than one-half of the circumference of the rail engaged by the scraper.

5. The printing system of claim 1, each scraper further comprising:
    a wiper positioned on the scraper to remove contaminant loosened from the rail engaged by the lip of the scraper.

6. The printing system of claim 5, wherein the wiper essentially consists of acrylonitrile-butadiene rubber.

7. The printing system of claim 1, each of the heating devices further comprising:
    a heat sheet or a heat rod configured to heat to a predetermined temperature.

8. The printing system of claim 7, wherein each of the heating devices are positioned inside the internal cavity.

9. The printing system of claim 7, wherein each of the heating devices are positioned outside the internal cavity.

10. The printing system of claim 1, wherein each wiper pad is disposed at an angle to direct contaminant removed from the rail engaged by the scraper.

11. The printing system of claim 1, wherein each scraper is disposed at an angle to direct contaminant removed from the rail engaged by the scraper.

12. The printing system of claim 1 further comprising:
    a wiper pad extending from the platform positioned to wipe the contaminant from a motor housing.

13. The printing system of claim 1 further comprising:
    a wiper blade extending from the platform positioned to wipe the contaminant from a motor housing.

14. The printing system of claim 1, wherein each rail essentially consists of a metal or ceramic material.

15. A three-dimensional object printing system comprising:
    two laterally spaced rails, each of the rails having an internal cavity extending through the rail along a longitudinal axis;

two heating devices, one heating device connected to the internal cavity of one of the two laterally spaced rails and the other heating device connected to the internal cavity of the other of the two laterally spaced rails to enable each heating device to heat a surface of the rail to which the heating device is connected;

a platform configured to support a three-dimensional object being formed by the three-dimensional object printing system;

a plurality of bearings mounted to the platform to enable the platform to be supported on the two laterally spaced rails; and a pair of scrapers mounted to the platform, one scraper being positioned to engage one of the two laterally spaced rails and the other scraper being positioned to engage the other of the two laterally spaced rails to enable the two scrapers to remove contaminant from the heated surfaces of the laterally spaced rails as the platform moves along the two laterally spaced rails.

16. The three-dimensional object printing system of claim 15, the plurality of bearings further comprising:

a pair of bearings mounted to the platform at right angle to one another to engage one of the laterally spaced rails; and a single bearing mounted to the platform to engage the other one of the laterally spaced rails.

17. The three-dimensional object printing system of claim 15 further comprising:

a wiper pad extending from the platform positioned to wipe the contaminant from a motor housing.

18. The three-dimensional object printing system of claim 15, each of the scrapers further comprising:

a lip configured to engage a portion of a perimeter of the rail.

19. The three-dimensional object printing system of claim 15, each of the scrapers further comprising:

a wiper positioned on the scraper to remove contaminant loosened from the rail engaged by the lip of the scraper.

20. The three-dimensional object printing system of claim 15, each of the heating devices further comprising:

a heat sheet or a heat pad configured to heat to a predetermined temperature.

* * * * *